United States Patent [19]

Gullickson

[11] 4,316,444
[45] Feb. 23, 1982

[54] STOVE CONSTRUCTION

[76] Inventor: Russell C. Gullickson, 745 Georges Ave., Brookfield, Wis. 53005

[21] Appl. No.: 98,078

[22] Filed: Nov. 28, 1979

Related U.S. Application Data

[63] Continuation-in-part of Ser. No. 960,037, Nov. 13, 1978, abandoned, which is a continuation-in-part of Ser. No. 832,336, Sep. 12, 1977, abandoned.

[51] Int. Cl.$^3$ .................. F24C 1/14; F24C 15/28; F24B 5/00; F24H 3/00
[52] U.S. Cl. ..................................... 126/77; 126/83; 126/15 R; 126/112
[58] Field of Search ............ 126/112, 77, 83, 79, 126/15, 146; 110/300

[56] References Cited

U.S. PATENT DOCUMENTS

| 627,525 | 6/1899 | Pfouts | 126/112 |
|---|---|---|---|
| 1,232,769 | 7/1917 | Carr | 126/112 |
| 1,523,508 | 1/1925 | Bibb | 126/112 X |
| 1,596,922 | 8/1926 | Clevenger et al. | 126/112 |
| 1,714,649 | 5/1929 | Walouke | 126/112 |
| 4,078,541 | 3/1978 | Roycraft | 126/112 X |

Primary Examiner—Albert W. Davis
Assistant Examiner—Wesley S. Ratliff, Jr.
Attorney, Agent, or Firm—Andrus, Sceales, Starke & Sawall

[57] ABSTRACT

A stove construction including a firebox that defines a combustion chamber. Air is supplied to the upper portion of the combustion chamber through a preheat manifold having outlet apertures spaced along the sides. Air is drawn from the atmosphere into the manifold where it is preheated and discharged in the form of jets toward the sloping side walls of the firebox and into the flow path of the waste gases of combustion. Due to the restriction to flow caused by baffles located in the spaces between the sides of the manifold and the sloping sidewalls, a portion of the mixture of air and waste gases is directed downwardly along the surface of combustion plates, which are spaced from the walls of the firebox, back toward the primary combustion area. The waste gases are further combusted as they pass downwardly along the heated combustion plates. The recirculation achieves complete combustion of the waste gases.

7 Claims, 5 Drawing Figures

STOVE CONSTRUCTION

This application is a continuation-in-part of application Ser. No. 960,037, filed Nov. 13, 1978, now abandoned which in turn is a continuation-in-part of application Ser. No. 832,336, filed Sept. 12, 1977, and now abandoned.

BACKGROUND OF THE INVENTION

Stoves have recently come into increased use as a supplemental heat source for homes and commercial and industrial establishments. To increase the efficiency and reduce smoke emission, stoves have included an air supply system in which air is drawn from the atmosphere and supplied to the upper end of the combustion chamber to aid in burning the combustible waste gases in a secondary combustion zone. Stoves, as utilized in the past, have also included an air heating system in which air is drawn from the atmosphere and passed in heat exchange relation to the firebox or stack, and the heated air is discharged into the surrounding room or enclosure to thereby provide heat in the form of convection as well as radiation.

SUMMARY OF THE INVENTION

The invention relates to an improved stove construction. The stove includes a firebox that defines a combustion chamber and air is supplied from the atmosphere to the upper portion of the combustion chamber through an elongated manifold or conduit having a plurality of outlet apertures spaced along its sides.

The heated air is discharged from the outlet apertures toward the converging walls of the firebox so that the waste gases of combustion passing upwardly in the combustion chamber are directed into contact with the heated air jetting from the apertures in the manifold. Baffles are provided between the manifold and the converging walls of the firebox to restrict the flow of gas to the stack and to recirculate a portion of the waste gases downwardly along combustion plates or shields which are spaced inwardly of the walls of the firebox. The flow of waste gases downwardly along the hot combustion plates perpetuates the combustion process and insures complete combustion of the waste gases.

Located above the combustion chamber is a heat exchange unit that includes a generally horizontal duct which provides communication between the combustion chamber and the atmosphere. Air is passed upwardly through a series of vertical passages which are in heat exchange relation to the duct, and the heated air is discharged from the upper end of the stove to thereby provide heating by convection, as well as radiation, to the surrounding environment.

The stove of the invention has improved efficiency over stoves as used in the past, providing substantially complete combustion of the waste gases so that there is no smoke emitted from the unit.

Heat is supplied to the adjoining environment both by radiation and convection due to the heat exchange system.

The stove is capable of completely combusting any type of fuel, such as wood, coal, trash, and the like.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
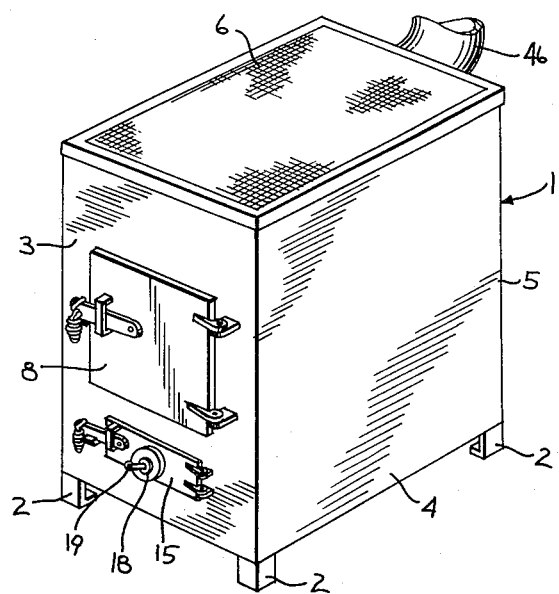
FIG. 1 is a perspective view of the stove construction of the invention.

FIG. 1 illustrates the stove construction of the invention which includes an outer housing 1 which is supported on legs 2. The housing 1 includes a front wall 3, a pair of sidewalls 4 and a rear wall 5. An expanded metal or perforated top 6 is connected to the upper edges of the front wall, sidewalls and end wall.

Figure 2:
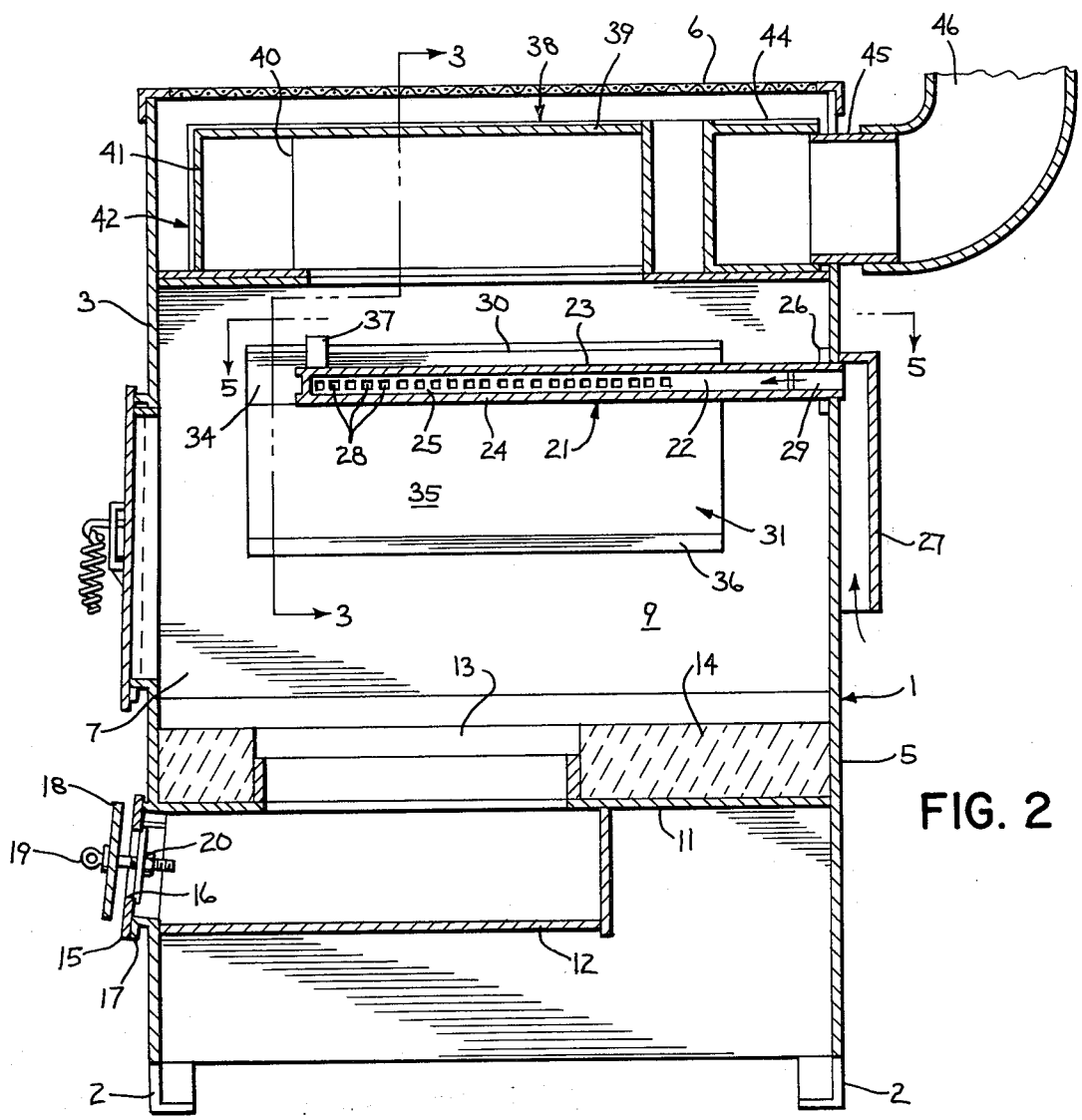
FIG. 2 is a vertical section of the stove.
Figure 3:
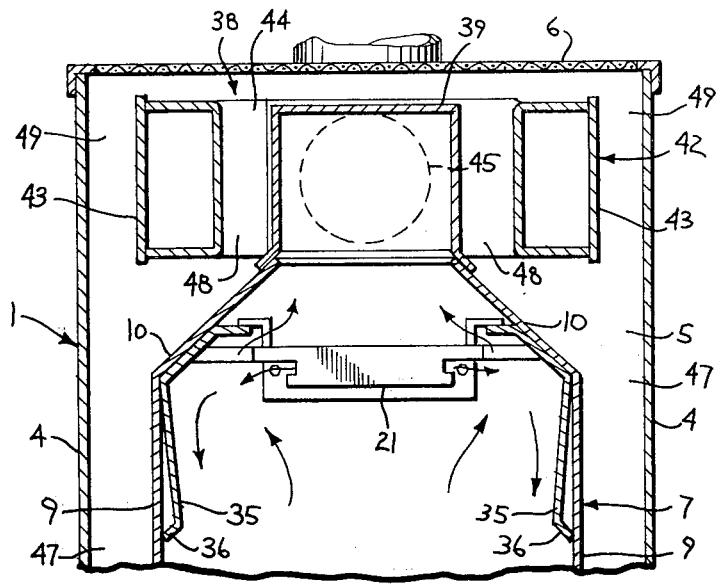
FIG. 3 is a section taken along line 3—3 of FIG. 2.

Located within the housing 1 is a steel firebox 7, and as shown in FIG. 2, the firebox extends completely across the front-to-rear dimension of the housing and a door 8, which is hinged to the front wall 3, provides access to the firebox.

The firebox 7 includes a pair of sidewalls 9 which are spaced inwardly of the sidewalls 4 of housing 1, and converging upper walls 10 are connected to each of the sidewalls 9. Connecting the bottom edges of sidewalls 9 is a bottom wall or floor 11 having a central opening which communicates with an ash box 12.

A series of grates 13 extend longitudinally in spaced relation above the ash box, and a refractory lining 14 is located around the grates on bottom wall 11 and extends partially up the sidewalls 9.

Door 15 provides access to the ash box 12, and the door 15 has a central circular opening 16 which borders flange 17 and a damper plate 18 encloses the opening 16. As best shown in FIG. 2, an I-bolt 19 is secured within an opening in plate 18 and is threaded within a strap 20 secured to the door. By threading the I-bolt 19, the damper plate 18 can be moved toward and away from the door 15 to provide an opening through which air is admitted to the ash box and then to the combustion chamber within the firebox.

In accordance with the invention, air is supplied from the atmosphere to the upper end of the firebox 7 through a generally rectangular preheating manifold or conduit 21 which extends partially across the firebox in a front-to-rear direction and defines a preheat chamber 22. The manifold 21 includes a top plate 23, a bottom plate 24 and a pair of side walls 25. The manifold is mounted to the firebox through a flange 26 which extends laterally from the rear end of the manifold and is bolted to the rear wall 5 of the firebox 7. With this construction, the manifold 21 can be withdrawn from the combustion chamber by removal of the bolts.

Air is supplied to the manifold 21 by a vertical tube or duct 27 which is mounted on the rear wall 5 and has an open lower end. The upper end of the tube communicates with the open rear end of manifold 21 so that air from the atmosphere will be drawn upwardly through the duct 27 into the manifold 21 and is preheated prior to introduction into the firebox.

The sidewalls 25 of manifold or conduit 21 is provided with a multiplicity of apertures 28 which are spaced along the side walls and are located generally centrally of the firebox. Diagonally extending baffles 29 are located within the rear portion of the manifold 21 and serve to direct the incoming air toward the center line of the manifold and thereby provide a more uniform discharge of air from the entire series of apertures 28. Due to the configuration of the manifold and the size and location of the apertures, preheated air will be discharged from the manifold 21 through the apertures 28 in a series of small jets, and the waste gases of combustion are directed by the converging walls 10 through the air jets to provide a scrubbing action and improve the combustion.

The total cross sectional area of the apertures 28 is less than the cross sectional area of the preheat chamber 22 so that the air being jetted through the apertures will have a substantial velocity.

Figure 5:
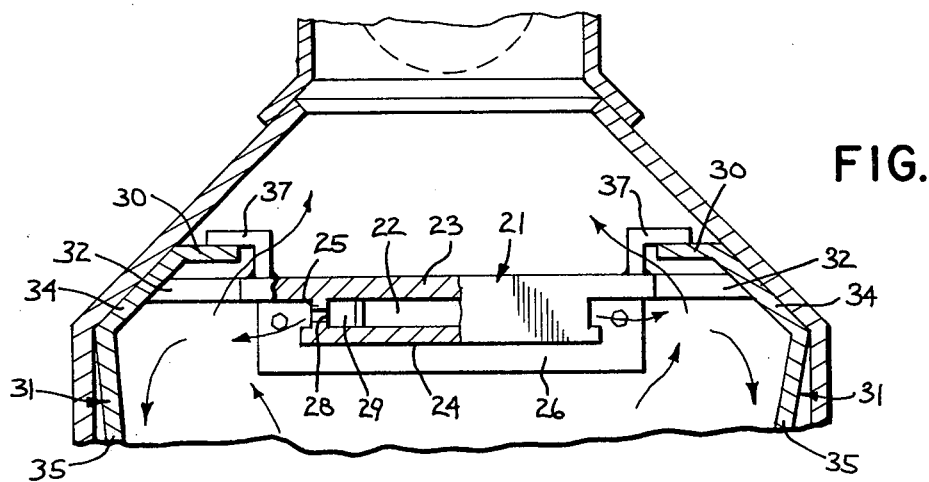
FIG. 5 is an enlarged view of the section shown in FIG. 3.
Figure 4:
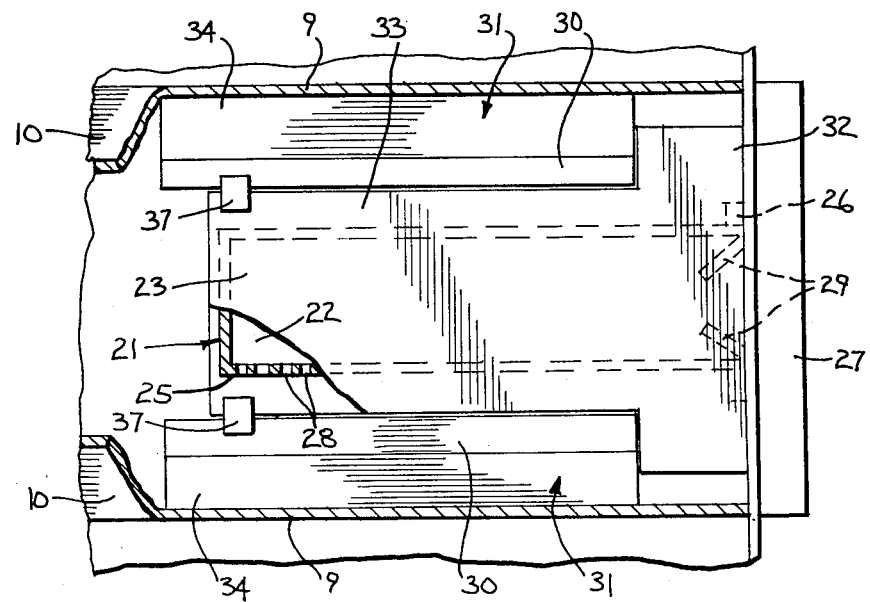
FIG. 4 is a section taken along line 4—4 of FIG. 2.

The draft is controlled by providing restricted passages between the outer lateral edges of top plate 23 of manifold 21 and the upper inwardly bent edges 30 of combustion plates 31, as illustrated in FIG. 5. As seen in FIG. 4, the rear portion 32 of the top plate 23 is in close proximity to the converging side walls 10 of the firebox 7, while the forward portion 33 of the top plate 23 has a lesser width and terminates in spaced overlying relation to the edges 30 of the combustion plates 31. Gas can flow upwardly through the spaces between the edges 30 and the upper plate 23 of manifold 21, as illustrated by the arrows in FIG. 5.

The combustion plates 31 extend forwardly, beyond the forward end of manifold 21, and each combustion plate includes a diagonal upper section 34 that is secured flatwise to the diagonal wall 10, a central section 35 which is spaced inwardly of the side wall of the firebox, and a bent lower edge section 36 that is welded to the side wall of the firebox. The forward and rear ends of the combustion plates 31 are not attached to the wall of the firebox so limited gas circulation can occur within the space between the central section 35 and the wall of the firebox. Due to the construction of the invention and the recirculation of waste gases, the combustion plates 31 are heated to extremely high temperatures, and the spacing of the combustion plates from the wall of the firebox will reduce the transfer of heat to the firebox, thereby retaining the high temperatures along the path of the recirculating waste gases to promote the combustion.

The forward end of manifold 21 is supported from the bent upper edges 30 of combustion plates 31 by L-shaped hangers 37 that are secured to top plate 23 and rest on the respective edges 30.

In operation, air is drawn into the manifold 21 through duct 27 and is jetted from the apertures 28 toward the sloping walls 34 and into the flow path of the waste gases of combustion. Due to the restriction caused by edges 30, a substantial portion of the mixture of air and waste gases is directed downwardly by the sloping walls 34 and is recirculated back down toward the primary combustion area. As the gas recirculates downwardly, it passes over the hot surface of the central section 35 of the combustion plate to perpetuate the combustion of the waste gases. Thus, the construction provides a continual recirculation of the waste gases to achieve improved air-waste gas contact, resulting in substantially complete combustion of the combustible waste gases.

Supported above the firebox is a heat exchange unit 38 which extends across the upper end of the housing 1.

The heat exchange unit 38 includes a central enclosure 39 having an open lower end which communicates with the upper end of the firebox. The central enclosure 39 has an opening 40 in the front side which communicates with a horizontal transverse section 41 of outer enclosure 42, and the ends of the transverse section 41 are in communication with the side sections 43 which are spaced laterally from the central enclosure 39. The rear ends of the side sections 43 are connected to a rear section 44 and an outlet 45 communicates with the rear section 44 and is connected to a chimney or stack 46 for discharge of the gases of combustion.

Air for space heating purposes is adapted to be drawn into the housing 1 through the open lower end of the housing and passes upwardly in the spaces 47 between the sides of the firebox 7 and the sidewalls 4. The air then flows through the central passages 48 located between the central enclosure 39 and side sections 43 of outer enclosure 42, as well as through the side passages 49 which are located between the side sections 43 and sidewalls 4.

Heat is transferred from the hot gases of combustion to the air passing upwardly around the firebox and through the heat exchange unit 38, and the heated air is discharged upwardly through the expanded metal top 6 into the surrounding environment.

Improved combustion efficiency is achieved by the air being jetted through the apertures 28 which, in combination with the combustion plates 31, effects continual recirculation and combustion of the mixture of combustible gases and air to achieve substantially complete combustion of the combustible waste gases.

The stove of the invention can be used in any residential, commercial or industrial application, and has particular use as a source of supplemental heating. Various types of materials such as wood, coal, waste, and the like can be used as fuel.

Various modes of carrying out the invention are contemplated as being within the scope of the following claims particularly pointing out and distinctly claiming the subject matter which is regarded as the invention.

I claim:

1. A stove construction, comprising a firebox defining a combustion chamber for primary combustion of combustible material, said firebox having an exhaust gas outlet in its upper end communicating with the combustion chamber, a preheat manifold disposed within the upper portion of the combustion chamber and defining a pre-heat chamber communicating with the atmosphere whereby air is drawn from the atmosphere into said preheat chamber and introduced into said combustion chamber, a wall connected to said firebox and spaced from the manifold to provide a passage therebetween for discharge of gases to the outlet, said wall sloping upwardly and inwardly in a direction toward said manifold, a flange extending inwardly from the sloping wall, the inner edge of the flange being spaced from the side edge of the manifold and the space between said inner edge of the flange and the side edge of the manifold constituting said passage, said manifold having a series of apertures communicating with said pre-heat chamber and facing said sloping wall, air being drawn from the atmosphere into said manifold being preheated in said pre-heat chamber and thereafter being discharged through said apertures toward said sloping wall and into contact with the waste gases of combustion passing upwardly through said passage, and a combustion member disposed beneath said sloping wall and spaced inwardly from the wall of the firebox, said construction effecting a downwardly recirculation of the mixture of combustible waste gases and air along the combustion member toward the primary combustion region to achieve substantially complete combustion of the combustible waste gases.

2. The stove construction of claim 1, wherein said manifold includes a tubular section that defines said pre-heat chamber and a top plate that extends laterally beyond the tubular section and is spaced from the inner edge of said flange, the space between the top plate and said inner edge constituting said passage.

3. The stove construction of claim 1, and including means to support the manifold from said flange.

4. A stove construction, comprising a firebox defining a combustion chamber, an exhaust gas outlet in the upper end of the firebox and communicating with the combustion chamber, a preheat manifold disposed in the upper portion of the combustion chamber, said manifold communicating with the atmosphere, a pair of sloping walls associated with the firebox and located on opposite sides of the manifold, each wall sloping upwardly and inwardly in a direction toward the manifold and spaced from the manifold to define a passage for the discharge of gases to said gas outlet, said manifold having a series of spaced apertures in opposite sides thereof, each series of apertures facing the respective sloping walls, air being drawn from the atmosphere into said manifold and being pre-heated in said manifold and thereafter being discharged through said apertures toward the sloping walls and into contact with the waste gases of combustion passing upwardly in said passages, and a combustion plate disposed immediately beneath each sloping wall and extending downwardly to a level beneath said manifold, each combustion plate being spaced from the wall of the firebox, said passages providing a restriction to the upward flow of said waste gas to the outlet to thereby effect a downward recirculation of the mixture of combustible waste gases and air within the combustion chamber along the combustion plates toward the primary combustion region to achieve substantially complete combustion of the combustible waste gases.

5. The stove construction of claim 4, wherein said combustion plate extends downwardly and inwardly from the respective wall, said plate having an outwardly bent lower edge secured to said firebox.

6. The stove construction of claim 4, wherein said manifold is elongated in a front-to-rear direction and has a generally rectangular cross section.

7. The stove construction of claim 6, wherein the front end of the manifold is closed, and the rear end of the manifold communicates with the atmosphere.

* * * * *